（12） United States Patent
Aklilu

(10) Patent No.: US 12,439,323 B2
(45) Date of Patent: Oct. 7, 2025

(54) METHOD AND SYSTEM FOR ROUTING AN INTERNET PROTOCOL DATA PACKET BETWEEN WIRELESS COMPUTER DEVICES CONNECTED TO A CELLULAR NETWORK

(71) Applicant: ARKIDAN SYSTEMS INC., Edmonton (CA)

(72) Inventor: Noah Aklilu, Edmonton (CA)

(73) Assignee: ARKIDAN SYSTEMS INC., Edmonton (CA)

( * ) Notice: Subject to any disclaimer, the term of this patent is extended or adjusted under 35 U.S.C. 154(b) by 387 days.

(21) Appl. No.: 17/910,534

(22) PCT Filed: Mar. 10, 2021

(86) PCT No.: PCT/CA2021/050325
§ 371 (c)(1),
(2) Date: Sep. 9, 2022

(87) PCT Pub. No.: WO2021/179082
PCT Pub. Date: Sep. 16, 2021

(65) Prior Publication Data
US 2023/0171673 A1 Jun. 1, 2023

Related U.S. Application Data

(60) Provisional application No. 62/988,227, filed on Mar. 11, 2020.

(51) Int. Cl.
*H04W 4/00* (2018.01)
*H04W 40/32* (2009.01)
(52) U.S. Cl.
CPC ................... *H04W 40/32* (2013.01)

(58) Field of Classification Search
None
See application file for complete search history.

(56) References Cited

U.S. PATENT DOCUMENTS

| 7,023,855 B2 | 4/2006 | Haumont et al. |
| 9,686,380 B1 | 6/2017 | Samudra et al. |
| (Continued) | | |

FOREIGN PATENT DOCUMENTS

| KR | 20170052446 A | 5/2017 |
| KR | 20180026164 A | 3/2018 |
| (Continued) | | |

OTHER PUBLICATIONS

European Patent Office, Communication with Supplementary European Search Report and European Search Opinion, in EP application No. 21767334.2, Feb. 21, 2024.
(Continued)

*Primary Examiner* — Zewdu A Beyen
(74) *Attorney, Agent, or Firm* — Aird & McBurney LP

(57) ABSTRACT

The invention facilitates private, low latency routing of an Internet Protocol data packet between wireless computer devices connected to a cellular network. A router system stores a device group relationship defining a set of unique device identifiers (UDIs) of devices. The router system receives, via a radio access network (RAN) of the cellular network but without traversing the Internet, the IP data packet including a UDI of a source device that generated the IP data packet. The router system may determine whether the data packet is public so as to be forwarded on the Internet, or private. If private, then the router system forwards, via the RAN but without traversing the Internet, the IP data packet to a destination device. The forwarding is conditional on the set of UDIs including both a UDI of the (Continued)

destination device, and the UDI of the source device included in the IP data packet.

30 Claims, 6 Drawing Sheets

(56) References Cited

U.S. PATENT DOCUMENTS

| | | | |
|---|---|---|---|
| 9,907,033 | B2 | 2/2018 | Lim et al. |
| 10,039,043 | B2 | 7/2018 | Zhang et al. |
| 10,149,210 | B2 | 12/2018 | Lim et al. |
| 10,159,021 | B2 | 12/2018 | Mok et al. |
| 2012/0203909 | A1 | 8/2012 | Kavanaugh et al. |
| 2017/0048739 | A1 | 2/2017 | Jeong et al. |
| 2017/0055248 | A1 | 2/2017 | Moon et al. |
| 2017/0111822 | A1 | 4/2017 | Jung et al. |
| 2017/0374589 | A1 | 12/2017 | Sang et al. |
| 2018/0092081 | A1 | 3/2018 | Chen et al. |
| 2018/0098376 | A1 | 4/2018 | Jang et al. |
| 2018/0146398 | A1 | 5/2018 | Kim et al. |
| 2018/0227929 | A1 | 8/2018 | Yoo et al. |
| 2018/0242291 | A1 | 8/2018 | Moon et al. |
| 2018/0270782 | A1 | 9/2018 | Park et al. |
| 2018/0278310 | A1 | 9/2018 | Lee et al. |
| 2018/0279330 | A1 | 9/2018 | Hong et al. |
| 2018/0324646 | A1 | 11/2018 | Lee et al. |
| 2018/0352416 | A1 | 12/2018 | Ryu et al. |
| 2018/0359773 | A1 | 12/2018 | Tesanovic |
| 2018/0368156 | A1 | 12/2018 | Agiwal et al. |
| 2018/0368167 | A1 | 12/2018 | Kim et al. |
| 2019/0082500 | A1 | 3/2019 | Shi et al. |
| 2019/0141562 | A1 | 5/2019 | Tyagi et al. |
| 2019/0281605 | A1 | 9/2019 | Fu et al. |
| 2019/0313318 | A1 | 10/2019 | Pawar et al. |
| 2020/0099625 | A1* | 3/2020 | Yigit .................. H04L 45/302 |

FOREIGN PATENT DOCUMENTS

| | | |
|---|---|---|
| KR | 20180050202 A | 5/2018 |
| KR | 20180118290 A | 10/2018 |
| WO | 2017102037 A1 | 6/2017 |
| WO | 2017171885 A1 | 10/2017 |
| WO | 2017204844 A1 | 11/2017 |
| WO | 2018030842 A1 | 2/2018 |
| WO | 2018070853 A1 | 4/2018 |
| WO | 2018084623 A1 | 5/2018 |
| WO | 2018084670 A1 | 5/2018 |
| WO | 2019245911 A1 | 12/2019 |

OTHER PUBLICATIONS

International Search Report issued in International Application No. PCT/CA2021/050325, May 19, 2021, 3 pages.

Written Opinion of the International Searching Authority issued in International Application No. PCT/CA2021/050325, May 19, 2021, 4 pages.

* cited by examiner

| Device | SPN User Account no. | UDI: SIM Card IMSI | Device Group: 6739-8508-C523-43E8-ABF8-9F3B-BC9B-BDBB (1 = Inside; 0 = Outside) | Device Group: 6739-8508-C523-43E8-ABF8-9F3B-BC9B-BDCC (1 = Inside; 0 = Outside) |
|---|---|---|---|---|
| 12a | 123456 | 302100123456781 | 1 | 0 |
| 12b | 123456 | 302100123456782 | 1 | 0 |
| 12c | 123456 | 302100123456783 | 1 | 0 |
| 12d | 654321 | 302100123456784 | 0 | 1 |
| 12e | 654321 | 302100123456785 | 0 | 1 |
| ... | ... | ... | ... | ... |

FIG. 4

METHOD AND SYSTEM FOR ROUTING AN INTERNET PROTOCOL DATA PACKET BETWEEN WIRELESS COMPUTER DEVICES CONNECTED TO A CELLULAR NETWORK

FIELD OF THE INVENTION

The present invention relates to routing of an Internet Protocol data packet between wireless computer devices connected to a cellular network.

BACKGROUND OF THE INVENTION

FIG. 1 shows a system for routing an Internet Protocol (IP) data packet (10) between wireless computer devices (12a, 12b, 12c, 12d), using a cellular network (14) including radio access network (RAN) (16) and a service provider network (SPN) (18), the Internet (20), and a server (22). The server (22) may be either a publicly accessible messaging server (e.g., a commercial cloud hosting service server), or a virtual private network (VPN) server (e.g., a corporate "Intranet" server). For security, the SPN (18) is configured with an access model that prevents transmission of the data packet (10) directly between the devices (12a to 12d). Instead, transmission of a data packet (10) from a first device (12a) to a second device (12b) requires transmission of the data packet (10) from the first device (12a) to the server (22) via the RAN (16), the SPN (18), and the Internet (20). The server (22) stores the data packet (10) until it is polled by the second device (12b), whereupon the server (22) transmits the data packet (10) to the second device (12b) via the Internet (20), the SPN (18), and the RAN (16). If the server (22) is a VPN server, then the first device (12a) may need to encrypt the data packet (10) before transmission, and the second device (12b) may need to decrypt the received data packet (10).

The time required for transmission of the data packet (10) along this path results in a latency (i.e., delay) between the first device (12a) initiating transmission, and the second device (12b) processing the data packet (10). Although current technologies may allow a latency of only a fraction of a second, this latency may still be human-perceptible and suboptimal for applications (e.g., video gaming, video and music streaming, and vehicle navigation) in which real-time data transmission is ideal. Further, encryption and decryption processing of the data packet (10) contributes to the latency, imposes a processing load on the devices (12a, 12b), and requires the devices (12a, 12b) to have certain processing capabilities.

There remains a need for technologies that facilitate private, low latency transmission of an IP data packet between wireless computer devices connected to a cellular network, preferably without running encryption and decryption processes on the devices.

SUMMARY OF THE INVENTION

In one aspect, the present invention comprises a method for routing an Internet Protocol (IP) data packet. The method is implemented by a router system adapted to transceive the IP data packet with a radio access network (RAN) of a cellular network, and with the Internet. The router system comprises a processor and an operatively connected memory storing instructions executable by the processor to implement the method. The method comprises the steps of: (a) storing a device group relationship defining a set of unique device identifiers of a plurality of wireless computer devices; (b) receiving, via the RAN but without traversing the Internet, the IP data packet including a unique device identifier of a source wireless computer device that generated the IP data packet; and (c) forwarding, via the RAN but without traversing the Internet, the IP data packet to a destination wireless computer device, wherein the forwarding is conditional on the set of unique device identifiers comprising both a unique device identifier of the destination wireless computer device, and the unique device identifier of the source wireless computer device included in the IP data packet.

In one embodiment of the method, the method further comprises, after the receiving step (b) and before the forwarding step (c), the step of determining whether the IP data packet is either to be forwarded via the Internet ("public") or not to be forwarded via the Internet ("private"), and wherein the forwarding step (c) is further conditional on determining that the IP data packet is private. In one embodiment of the method, the method may further comprise the step of forwarding the IP data packet to the Internet, conditional on the determining that the IP data packet is public. In one embodiment of the method, the step of determining whether the IP data packet is public or private is based on the IP data packet being public if the IP data packet has a first data packet structure, and the IP data packet being private if the IP data packet has a second data packet structure that is different from the first data packet structure. The first data packet structure may be an IPv6 data packet structure, and the second data packet structure may be an IPv4 data packet structure, or vice versa. In another embodiment of the method, the step of determining whether the IP data packet is public or private step is based on the IP data packet being public if the IP data packet has a destination IP address within a specified IP address block, and the IP data packet being private if the destination IP address is outside of the specified IP address block, or vice versa.

In one embodiment of the method, each of the unique device identifiers comprises an international mobile subscriber identity (IMSI) or part thereof, stored in a SIM card memory or other memory associated with each of the plurality of wireless computer devices. The device group relationship may define the set of unique device identifiers by association of the IMSIs to a common user account or related user accounts of the cellular network. In one embodiment of the method, each of the unique device identifiers comprises an international mobile equipment identity (IMEI) stored in a memory associated with each of the plurality of wireless computer devices.

In one embodiment of the method, the RAN is a 5G network.

In another aspect, the present invention comprises a router system for routing an Internet Protocol (IP) data packet. The router system is adapted to transceive the IP data packet with a radio access network (RAN) of a cellular network, and with the Internet. The router system comprises a processor and an operatively connected memory storing instructions executable by the processor to implement one or a combination of the embodiments of the method for routing an Internet Protocol (IP) data packet, as described above.

In another aspect, the present invention comprises a computer program product comprising a non-transitory, tangible, computer readable medium storing instructions executable by a processor forming part of a router system adapted to transceive the IP data packet with a radio access network (RAN) of a cellular network, and with the Internet, to implement one or a combination of the embodiments of the method for routing an Internet Protocol (IP) data packet, as described above.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 4 shows an embodiment of device group relationships defining sets of unique device identifiers (UDIs), using IMSIs of SIM cards installed in wireless computer devices.

DETAILED DESCRIPTION OF EMBODIMENTS OF THE INVENTION

Figure 1:
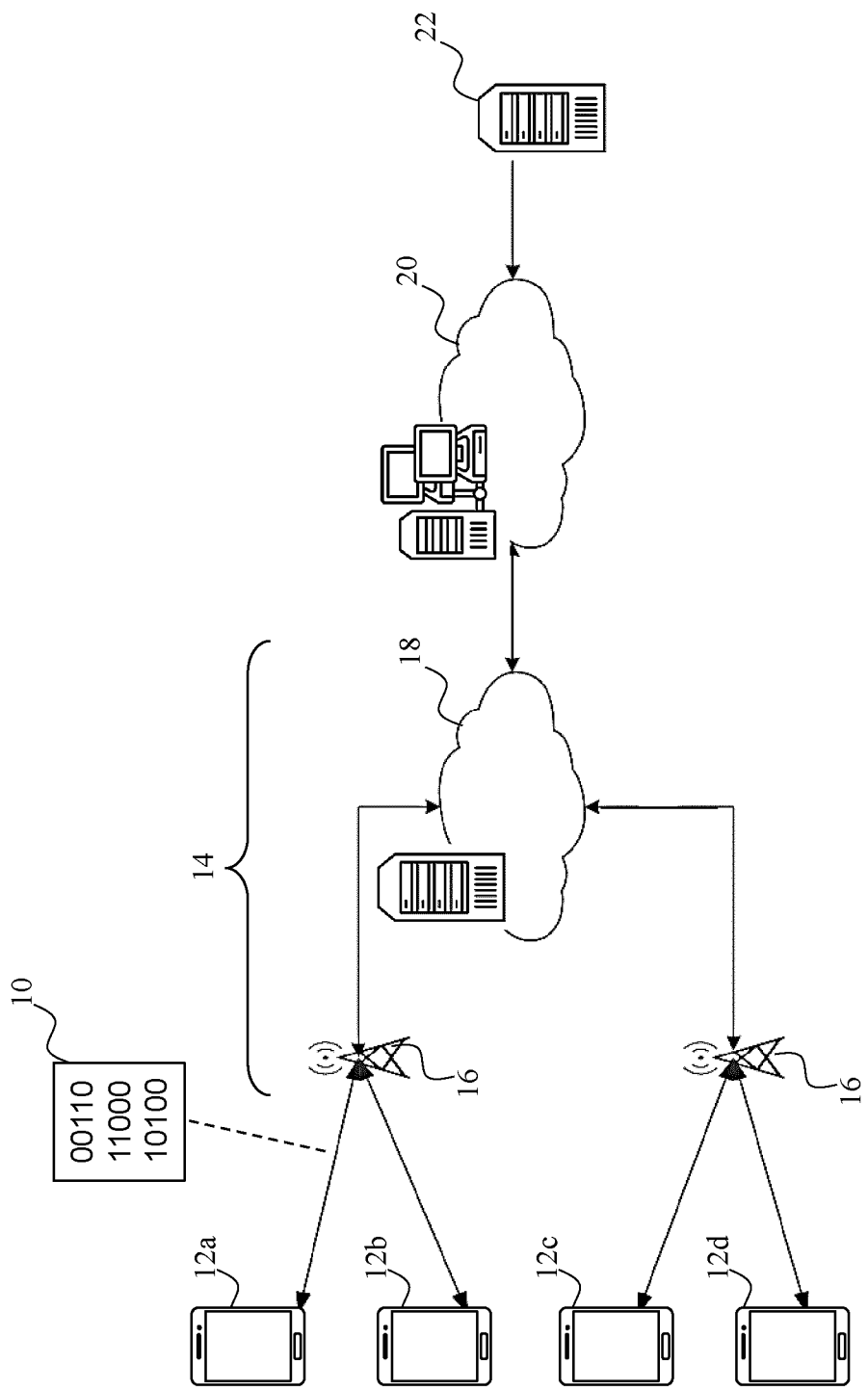
FIG. 1 shows a schematic depiction of a prior art system for routing an IP data packet between wireless computer devices.

Definitions.

The invention relates to routing of an Internet Protocol (IP) data packet between wireless computer devices using a cellular network. Any term or expression not expressly defined herein shall have its commonly accepted definition understood by a person skilled in the art. As used herein, the following terms have the following meanings:

"Cellular network" refers to a communications network that uses fixed-location transceiver units (transmitter and receiver) for wireless transmission and reception of an IP data packet to and from a wireless computer device.

"International mobile equipment identity" or "IMEI" refers to a unique numeric identifier assigned to a wireless computer device, in accordance with guidelines of the Groupe Spéciale Mobile Association (London, United Kingdom). An IMEI may be stored in a memory associated with a wireless computer device.

"International mobile subscriber identity" or "IMSI" refers to a unique numeric identifier assigned to a user of a cellular network, in accordance with guidelines of the ITU Telecommunication Standardization Sector (ITU-T) (Geneva, Switzerland). An IMSI may be stored in the memory of a subscriber identity module (SIM) card installed in a wireless computer device, or another memory associated with a wireless computer device.

"Internet Protocol data packet" or "IP data packet" refers to a data message that is configured for transmission on the Internet in accordance with the Internet Protocol (IP). In embodiments, an IP data packet may comprise a header section including a source IP address and a destination IP address for addressing and routing of the data packet, and a payload section of user data. As non-limiting examples, the user data may encode text, numerical, audio, image, or video information. Non-limiting examples of IP data packets include an IPv4 data packet and an IPv6 data packet (Internet Engineering Task Force (IETF); Fremont, California, USA). An IPv4 data packet uses IP addresses in the form of a 32-bit integer, which may be expressed as four period-separated octets of decimal numbers. An IPv6 data packet uses IP addresses in the form of eight colon-separated groups of four hexadecimal digits, which may be expressed by omitting any leading zeros within a group, and by replacing consecutive sections of zeros with a double colon "::".

"Memory" refers to a non-transitory tangible medium for storing information in a format readable by a processor, and/or instructions readable by a processor to implement an algorithm. Non-limiting types of memory include solid-state, optical, and magnetic computer readable media. A memory may comprise a plurality of operatively connected, physically discrete devices, despite use of the term in singular form.

"Processor" refers to an electronic device that is capable of reading or processing data stored on a memory or provided in a data signal, and/or executing instructions stored on a memory to perform an algorithm. Non-limiting examples of processors include devices referred to as microprocessors, microcontrollers, central processing units (CPU), and digital signal processors. A processor may comprise a plurality of operatively connected, physically discrete devices, despite use of the term in singular form.

"Wireless computer device" refers to an electronic device equipped with a modem and antenna(s) adapted for wireless transmission and reception of an IP data packet to and from a cellular network, regardless of whether or not the device is portable. Non-limiting examples of wireless computer devices include laptop computers, tablet computers, smart phones, wearable computers, computers onboard vehicles, and "smart equipment" such as monitors, speakers, sensors, cameras, HVAC system components, lighting, home appliances, and security system components.

System.

Figure 2:
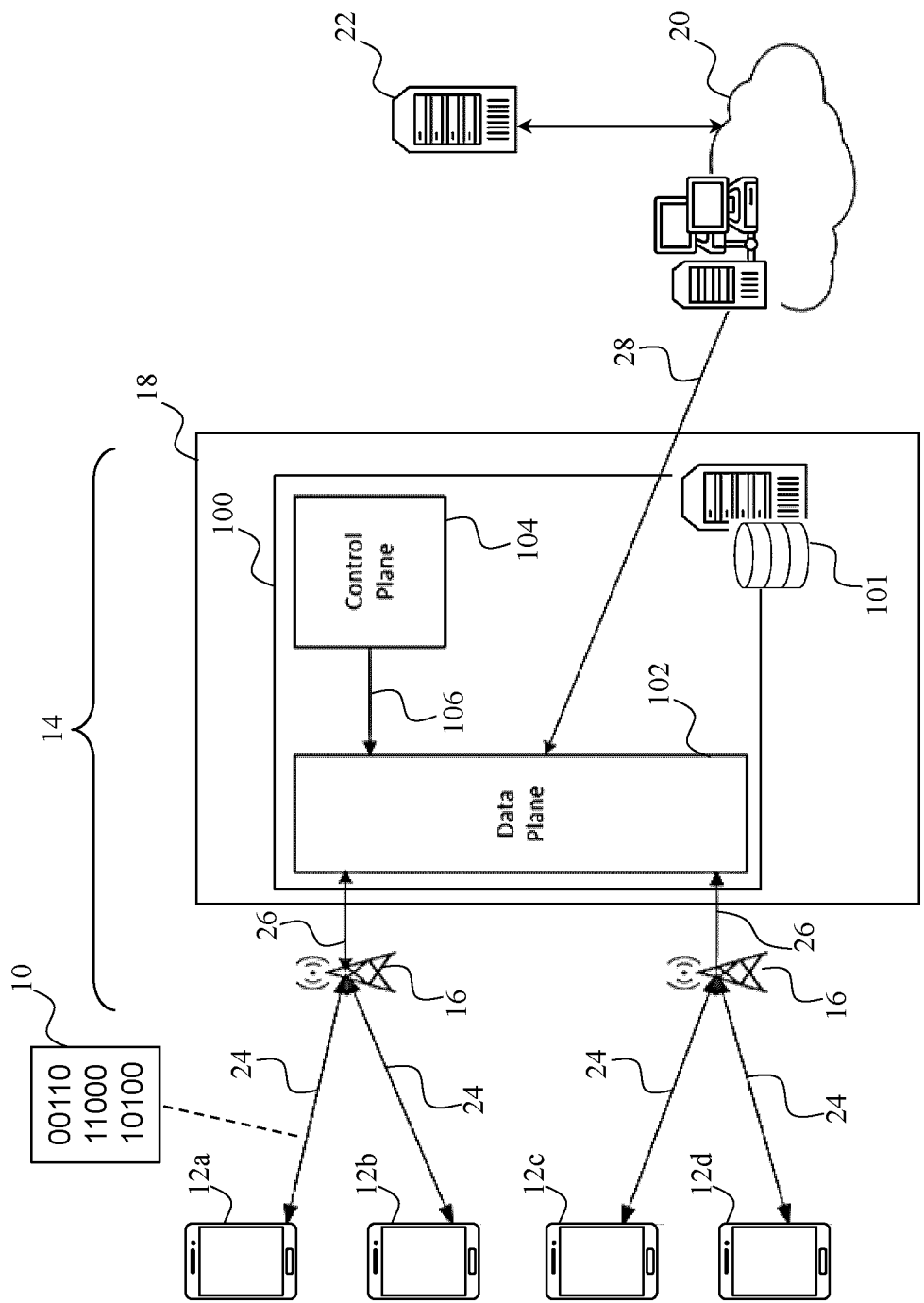
FIG. 2 shows a schematic depiction of an embodiment of a router system of the present invention for routing an IP data packet between wireless computer devices, in relation to a radio access network (RAN), the Internet, and a server.

FIG. 2 shows a schematic depiction of an embodiment of a router system (100) of the present invention for routing an Internet Protocol (IP) data packet (10) between wireless computer devices (12a to 12d), in relation to a cellular network (14) that includes a radio access network (16) and a SPN (18), and in relation to the Internet (20) connected to a server (22). The router system (100) forms part of the service provider SPN (18) that mediates backbone access of the devices (12a to 12d) to the Internet (20). The router system (100) is adapted to transceive IP data packets with the RAN (16) and with the Internet (20) by networking hardware of the SPN (18) as known in the art (e.g., gateways, bridges, access points, cables, switches, drivers, hubs, repeaters, etc.). The lines (24) between the devices (12a to 12d) and the RAN (16) represent bi-directional wireless data transmission paths for the IP data packet (10). The lines (26) between the antenna-transceiver units of the RAN (16) and the router system (100), and the line (28) between the router system (100) and the Internet (20), represent bi-directional data transmission paths for the IP data packet (10), which may be implemented by wired, fiber optic, and/or wireless components.

The router system (100) is not limited in implementation by the type or number of devices (12), or by the payload of the IP data packet (10). As a non-limiting example, the devices (12a to 12d) may be tablet computers running a networked video game application on Android™ (Google Inc., Mountain View, California, USA), iOS™ (Apple Inc; Cupertino, California, USA) operating systems, or other operating systems, and the IP data packet (10) payload may indicate the location of a video game character in a video game environment that is rendered on the screens of the devices (12a to 12d). As another non-limiting example, the devices (12a, 12b) may be a laptop computer and a computer onboard an aircraft, jointly running a networked aerial surveying application, and the IP data packet (10) payload may indicate the position of a survey position marker on a map rendered on the screens of the devices (12a, 12b). As another non-limiting example, the devices (12a, 12b) may be a laptop computer and a smart speaker, and the IP data packet (10) payload may include a portion of an audio file streamed by the laptop computer to the smart speaker for conversion to sound output. As another non-limiting example, the devices (12a, 12b) may be a "smart" digital video camera and a "smart" display monitor of a security system, and the IP data packet (10) payload may be digital video data streamed by the video camera to the display monitor for video output. In such applications, private, low latency transmission of the IP data packet (10) between the devices (12a to 12d) may be desired.

The router system (100) is not limited in implementation by any particular technology of the RAN (16) of the cellular network (14). As non-limiting examples, the cellular network (14) may be a fourth generation (4G) network or a fifth generation (5G) network. Implementation with a fifth generation (5G) cellular network may be advantageous because such a network is characterized by a high spatial density of wireless antenna-transceiver units spaced-apart by distances typically less than about 300 meters (1000 feet). The resulting ubiquity of antenna-transceiver units facilitates "always-on" connectivity of the devices (12a to 12d) to the cellular network (14).

The router system (100) includes a processor and an operatively connected memory, shown collectively as (101) in FIG. 2. The processor and the memory (101) are not limited in implementation by any particular hardware specification. As a non-limiting example, they may be implemented using a general purpose or specialized central processing unit (CPU) and a hard disk memory, running on an operating system based on the Unix™ or Linux™ operating system. The memory stores instructions readable by the processor to execute a routing method as described below. This memory (i.e., a non-transitory computer readable medium) storing such instructions may be considered a computer program product of the present invention. In FIG. 2, the hardware (processor and memory) and software (the instructions stored on the memory) components of the router system (100) are functionally conceptualized as a data plane (102) and a control plane (104), with an operative connection (106) therebetween. The data plane (102) routes data packets from and to the devices (12a to 12d) via the cellular network (14), or the Internet (20), as the case may be, in accordance with instructions provided by the control plane (104). The control plane (104) defines a logical routing protocol that instructs the data plane (102) to forward the IP data packet (10) from one the devices (12a to 12d) either to the other devices (12a to 12d) via the RAN (16) (without traversing the Internet (20)), or to the Internet (20), in accordance with the routing method as described below. Method.

Figure 3:
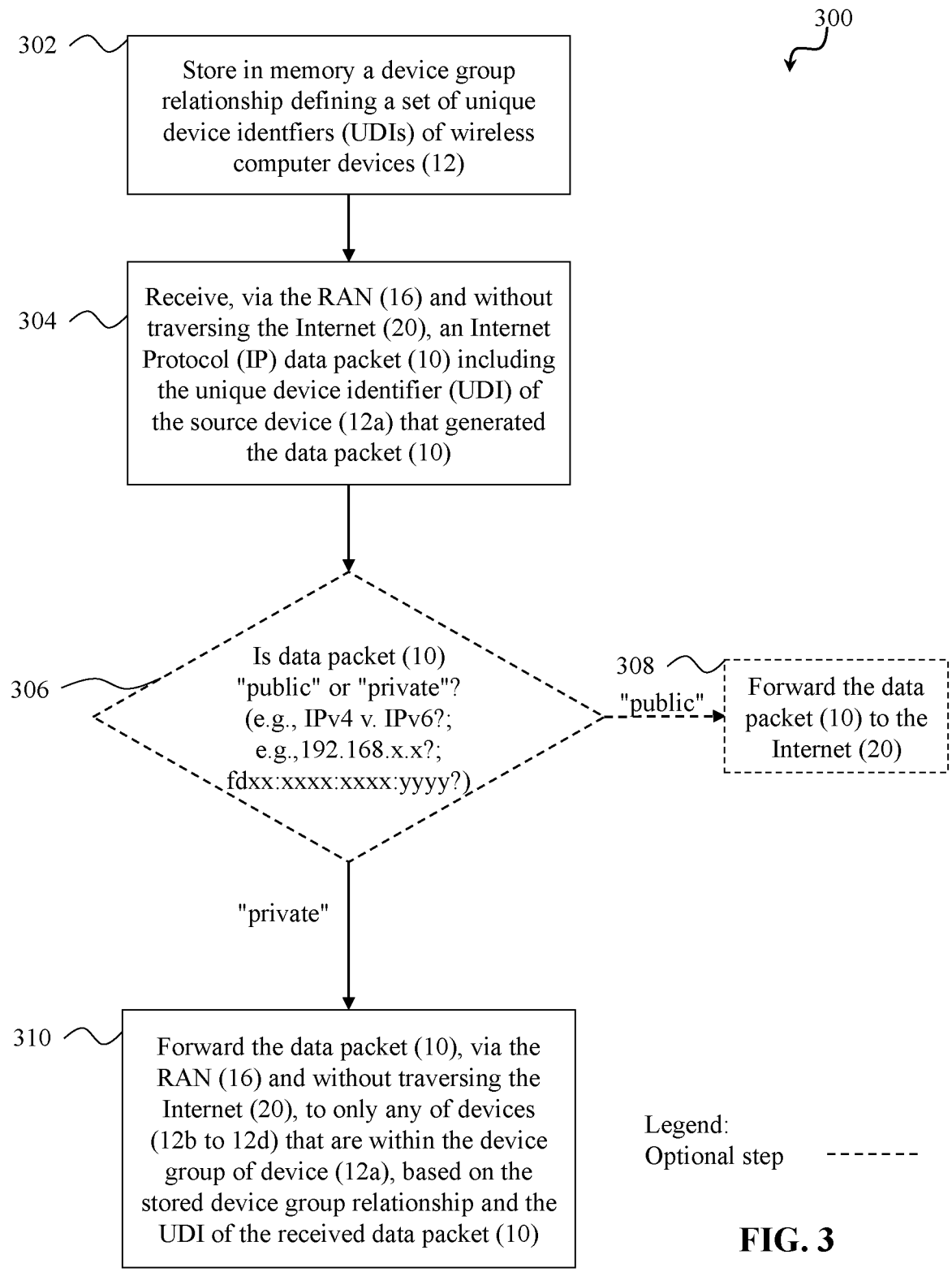
FIG. 3 shows a flow chart of an embodiment of a method of the present invention for routing an IP data packet between wireless computer devices, which method is implemented by the router system of the present invention.

FIG. 3 shows a flow chart of an embodiment of a method (300) for routing an Internet Protocol (IP) data packet (10) between the devices (12a to 12d), which is implemented by the router system (100).

Implementation of the method (300) is predicated on two conditions. The first condition is that each device (12a to 12d) is associated with a "unique device identifier" ("UDI")—i.e., a label that distinguishes each one of the devices (12a to 12d) from any other one of the devices (12a to 12d). The method is not limited in implementation by any format of UDI, or manner in which the UDI is determined. In one embodiment, the UDI may be part or all of an IMSI, either stored on a SIM card installed in the device (12a to 12d), or another memory physically associated with each device (12a to 12d). Although SIM cards may be transferrable between devices (12a to 12d), the IMSIs uniquely identify the devices (12a to 12d) because each SIM card is associated with only one of the devices (12a to 12d) at a time. An example of part of an IMSI that may be used as an IMSI is the mobile subscription identification number (MSIN). In another embodiment, the UDI may be an IMEI associated with each device (12a to 12d). In still other embodiments, the users of the devices (12a to 12d), or the operator of the SPN (18) may assign a UDI to each of the devices (12a to 12d). For example, the users of devices (12a to 12d) may create UDIs in the form of a series of numbers, letters, other characters, or a combination of the foregoing, using an input interface, such as an input interface of a networked video gaming application.

The second condition is a "device group" relationship that defines a set of one or more of the UDIs. The method is not limited in its implementation by any particular manner by which the device group relationship defines the set of UDIs. As a non-limiting example, use of IMSIs as UDIs may define device groups with reference to a user account associated with the SPN (18). To explain, the operator of the SPN (18) (e.g., a telecommunications provider) may maintain an electronic record of IMSIs on SIM cards issued by the operator, in association with a user account for contract and billing purposes. Multiple SIM cards (and hence multiple IMSIs) may be associated with a single user account or related user accounts, such as in the case of a "family data plan" used by family members, or a "business data plan" used by employees of a common employer. Accordingly, the device group relationship may define the set of UDIs by association of the IMSIs to a user account or related user accounts of the SPN (18) of the cellular network (14). In other embodiments, the users of devices (12a to 12d), or the operator of the SPN (18) may assign each of the UDIs to one or more device groups. For example, the user of devices (12a to 12d) may define a device group using an input interface, such as an input interface of a networked video gaming application.

The method (300) begins with step (302) of the router system (100) storing in its memory a device group relationship that defines a set of two or more UDIs of wireless computer devices (12). The method (300) is not limited in implementation by the nature of any data structure, or functional relationship that defines the device group. As non-limiting examples, the device group may be stored as a tabular relational database, or as a tree mapping function from which the included set of UDIs is determinable by the processor of the router system (100). As a non-limiting example, FIG. 4 shows a tabular relational database of UDIs in the form of the IMSIs of the devices (12a to 12d) and another device (12e) mapped to two device groups. The device group labelled "67398508-0523-43E8-ABF8-9F3B-BC9B-BDBB" includes the IMSIs of devices (12*a* to 12*c*) because they are associated with a common user account number "123456" in the stored records of the SPN (18) operator. Device (12*d*) and another device (12*e*), however, are under another device group labelled "6739-8508-0523-43E8-ABF8-9F3B-BC9B-BDCC" by virtue of their IMSIs being associated with a different user account number "654321" in the stored records of the SPN (18) operator. The method (300) is not limited by the number of devices, the number of device groups, or the number of UDIs within each device group. Further, the method (300) is not limited by exclusivity of UDIs to a particular device group. That is, a UDI may belong to more than one device group. In this example, the device group is labelled by a Globally Unique Identifier (GUID), also known as a universally unique identifier (UUID), which is a 128-bit number used to uniquely identify information in computer systems, and generated in accordance with industry standards known to persons skilled in the art (e.g., standard RFC 4122; Internet Engineering Task Force (IETF)). The use of GUIDs is a non-limiting example of how one device group may be labelled to distinguish it from another device group. It will be understood that device groups may be distinguished from each other by using other unique labels, such as an user account number stored in the records in the SPN (18) operator.

The method (300) continues with step (304) of the router system (100) receiving, via the RAN (16), but without traversing the Internet (20), an Internet Protocol (IP) data packet (10) including the UDI of the device (12*a*) that generated the data packet (10). For convenience, the device (12*a*) is hereinafter referred to as the "source" device (12*a*). The method is not limited in implementation by any particular process by which the UDI is included in the data packet (10). Continuing the foregoing example of FIG. 4, the source device (12*a*) may run a video gaming application that configures the source device (12*a*) to query the memory of the SIM card installed on the source device (12*a*) to determine the IMSI as the UDI. The video gaming application stores the IMSI "302100123456781", and includes it the header section of the IP data packet (10) generated by the application, and transmitted by source device (12*a*). As a non-limiting example the IMSI may be included in a so-called extension, reserved, authentication, or optional field of the header of a standard IPv4 data packet or a standard IPv6 data packet, without the need to modify the standard data packet structure.

In one embodiment, the method (300) continues with optional step (306) of the router system (100) determining whether the data packet (10) is "public"—i.e., to be forwarded to the Internet (20)—or "private"—i.e., to be forwarded to the RAN (16) without traversing the Internet (20). If the data packet (10) is "public", then the method (300) continues with step (308) of forwarding the data packet to the Internet (20). Conversely, if the data packet is a "private", then the method (300) continues with step (310). In other embodiments, the method (300) may be implemented to characterize any data packet (10) as "private", such that the method (300) proceeds directly from step (304) to step (310) without performing step (306). There may be a variety of reasons for some data packets being "public", and for other data packets to be "private." For example, in a video gaming application, "public" data packets may contain general information about player status (e.g., scoring records) that is intended to be available to a broad community of players via the Internet (20), while "private" data may contain information (e.g., player position in a video game environment) that is relevant to an active session of networked game play among only a subset of players.

In one embodiment, the determination of whether the IP data packet is "public" or "private" is based on the data packet structure. Continuing the foregoing example, the SPN (18) may allocate both an IPv4 address and an IPv6 to each of the devices (12*a* to 12*d*) upon authentication to the cellular network (14). This address allocation may be temporary, such as in accordance with Dynamic Host Configuration Protocol (DHCP). The video gaming application running on the source device (12*a*) may configure the source device (12*a*) to transmit an IPv6 data packet if the IP data packet (10) is to be "public", and conversely an IPv4 data packet if the data packet is "private." If the router system (100) receives an IPv6 data packet (10), then the router system (100) determines the IP data packet (10) to be "public". Conversely, if the router system (100) receives an IPv4 data packet (10), then the router system (100) determines the IP data packet (10) to be "private." In another example, an IPv4 data packet may be determined as "public", and an IPv6 data packet may be determined as "private." In other non-limiting examples, the router system (100) may differentiate between "public" and "private" data packets on the basis of IP data packet structures other than IPv4 and IPv6.

In another embodiment, the determination of whether the IP data packet is "private" or "public" is based on the destination address of the data packet (10), with reference to a specified IP address block. As a non-limiting example, the Internet Engineering Task Force (IETF) and the Internet Assigned Numbers Authority (IANA) reserve certain IPv4 and IPv6 IP address blocks for use on local or private networks, with examples being the IPv4 address block specified by the range 192.168.0.0 to 192.168.255.255, and the IPv6 address block fdxx:xxxx:xxxx:yyyy:zzzz.zzzz.zzzz:zzzz If the router system (100) receives a data packet (10) with a destination address within the specified IP address block, then the router system (100) determines the IP data packet (10) to be "private"; otherwise, the router system (100) determines the data packet (10) to be "public."

If the data packet (10) is determined or considered to be "private", then the method (300) continues with step (310) of the router system (100) forwarding the data packet (10), via the RAN (16) but without traversing the Internet (20), to only any of the devices (12*b* to 12*d*) that are within the device group of source device (12*a*). This determination is based on the set of UDIs defined by the stored device group relationship (as per step (302)) and the UDI included in the data packet (10) (as per step (304)). In other words, in step (310), forwarding of the data packet (10) via the RAN (16) to device (12*b*, 12*c*, or 12*d*) (as the case may be) is conditional on the set of UDIs defined by the device group relationship including both the UDI of the source device (12*a*) and the UDI of device (12*b*, 12*c*, or 12*d*) (as the case may be) in question. Continuing with the example of FIG. 4, the router system (100) runs a query on the IMSI "302100123456781" included on the received data packet (10), which query returns the device group labelled "67398508-0523-43E8-ABF8-9F3B-BC9B-BDBB" including the IMSIs of device (12*b*) and device (12*c*), but not device (12*d*) and device (12*e*). Further, suppose that the received data packet (10) is an IPv4 data packet with a destination address of "239.10.10.10." This address is within the address block range of 224.0.0.0-239.255.255.255 reserved by the Internet Engineering Task Force (IETF) and the Internet Assigned Numbers Authority (IANA) for multicast destination addresses. (The general implementation of IP multicast in accordance with the Internet Protocol is known to persons skilled in the art.) Further still, suppose that each of devices (12a to 12d) have established membership in the multicast group for multicast IP address "239.10.10.10", such as in accordance with the Internet Group Management Protocol. The router system (100) forwards the data packet (10) via the RAN (16) and without traversing the Internet (20), to device (12b) and device (12c) because, according to the set of UDIs defined by the device group relationship, they are within the device group of source device (12a). Conversely, the router system (100) does not forward the data packet (10), via the RAN (16) and without traversing the Internet (20), to device (12d) because, according to the set of UDIs defined by the device group, it is not within the device group of source device (12a). Thus, routing of the data packet (10) is "private" in respect to devices (12a to 12c), by exclusion of device (12d) despite device (12d) having membership in the multicast group. For convenience and for this reason, devices (12b, 12c) are hereinafter referred to as "destination" devices, while device (12d) is hereinafter referred to as an "excluded" device.

In another embodiment, the step (310) of forwarding the data packet (10) may use an automated IP discovery technique based on proximity or locality of the destination devices (12b to 12c) to the router system (100). An example is Simple Service Discovery Protocol (SSDP). (The general implementation of SSDP in accordance with the Internet Protocol is known to persons skilled in the art.) SSDP is used to advertise the availability of services to "local" devices. SSDP may use certain reserved multicast addresses, which are dependent on "private" routing in accordance with the method (300) of the present invention. For example, source device (12a) could advertise that it is an Internet Protocol (IP) camera, and destination devices (12b and 12c) in the form of display monitors can display video encoded by video data packets generated by device (12a). Use of SSDP avoids the need to have the router system (100) publish services because SSDP provides services only to "local" devices, which in the present method (300) would be the devices (12b and 12c) in the same device group as device (12a).

The destination devices (12b, 12c) receive and process the forwarded data packet (10). As a non-limiting example, the payload of the IP data packet (10) may indicate the updated location of a player character in a video game environment, resulting from input commands received by the source device (12a). The destination devices (12b, 12c) use this information to render on their display screens the video game environment with the player character in the updated location. The excluded device (12d) is not affected.

Figure 5:
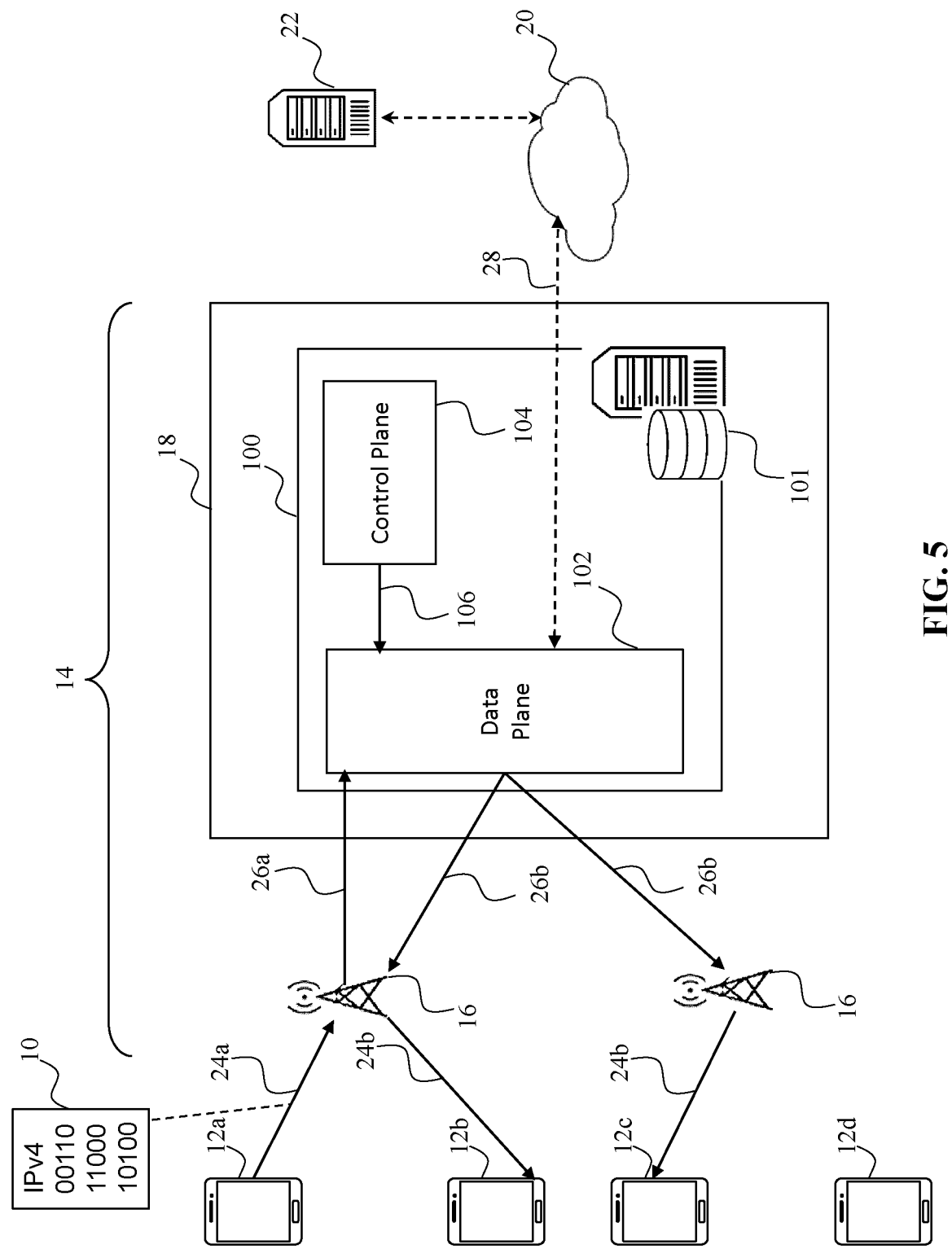
FIG. 5 shows a schematic depiction of the routing of a "private" IP data packet between wireless computer devices, in accordance with an embodiment of a method of the present invention.

FIG. 5 shows a schematic depiction of the routing of a "private" IP data packet (10) from source device (12a) to destination devices (12b and 12c) in accordance with the example of the method (300), as described above. The source device (12a) generates an IPv4 structure data packet (10) with an IP multicast address, and transmits it via wireless data transmission path (24a) to the RAN (16). The RAN (16) forwards the IP data packet (10) via data transmission path (26a) to the data plane (102) of the router system (100). The control plane (104) of the router system (100) determines the data packet (10) to be "private" by virtue of it having an IPv4 structure rather than an IPv6 structure. Accordingly, the control plane (104) instructs the data plane (102) to forward the IP data packet (10) via return data transmission paths (26b) to the RAN (16). The RAN (16) forwards the IP data packet (10) via return wireless data transmission paths (24b) to destination devices (12b and 12c), but not to the excluded device (12d). Accordingly, routing of the data packet (10) from device (12a) to destination devices (12b and 12c) does not require the IP data packet (10) to traverse the Internet (20), despite the operative connection of the router system (100) to the Internet (20), as shown in FIG. 5 by data transmission path (28) in dashed line.

Figure 6:
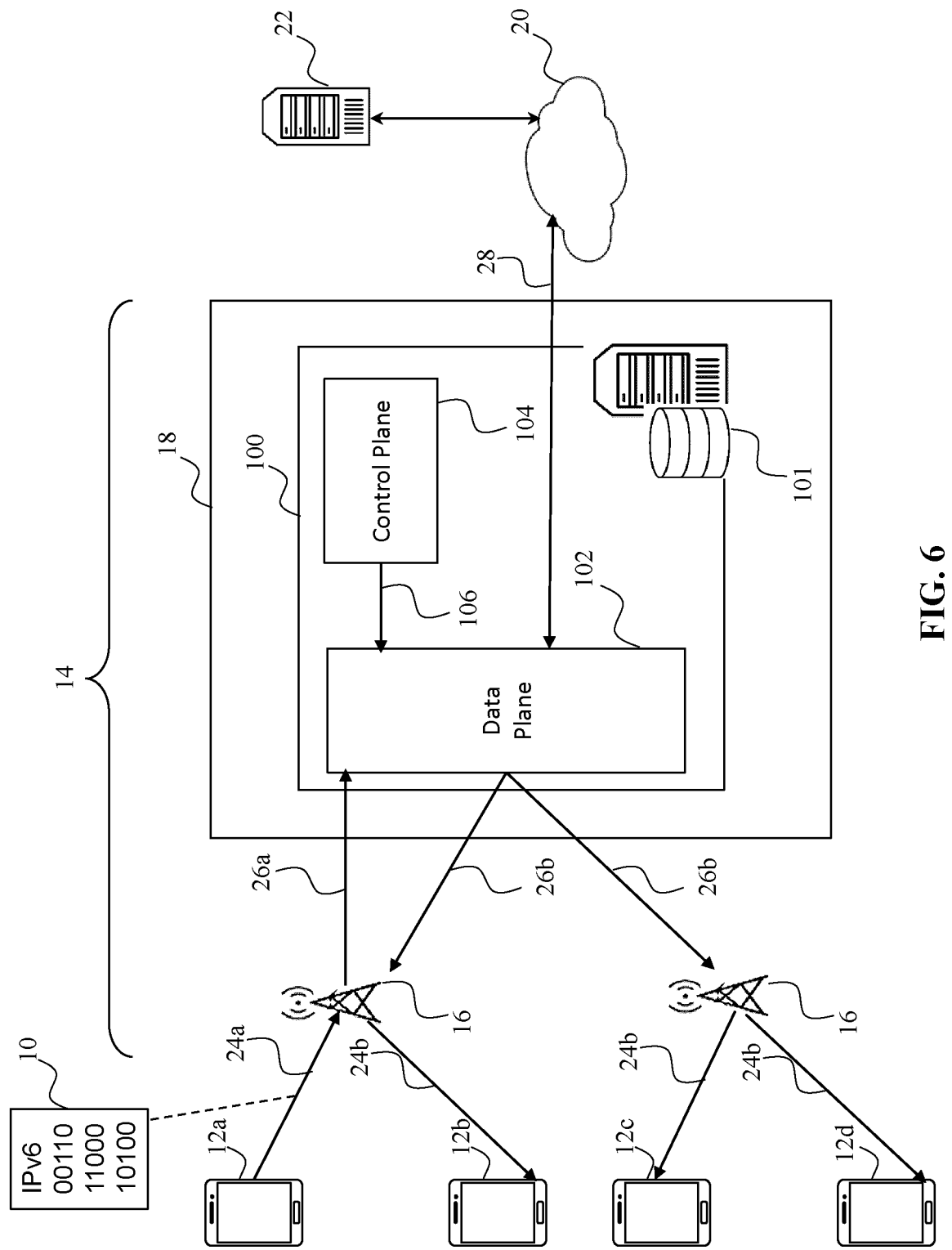
FIG. 6 shows a schematic depiction of the routing of a "public" IP data packet between wireless computer devices, in accordance with an embodiment of a method of the present invention.

FIG. 6 shows a schematic depiction of the routing of a "public" IP data packet (10) from source device (12a) to devices (12b, 12c, 12d) in accordance with the example of the method (300), as described above. The source device (12a) generates an IPv6 structure data packet (10) with an IP multicast address, and transmits it via wireless data transmission path (24a) to the RAN (16). The RAN (16) forwards the data packet (10) via data transmission path (26a) to the data plane (102) of the router system (100). The control plane (104) of the router system (100) determines the data packet (10) to be "public" by virtue of it having an IPv6 structure rather than an IPv4 structure. Accordingly, the control plane (104) instructs the data plane (102) to forward the data packet (10) via data transmission path (28) and the Internet (20) to server (22). The server (22) stores the data packet (10) until it is polled by device (12b, 12c, or 12d) as the case may be. Upon being polled, the server (22) transmits the data packet (10) via data transmission path (28) and the Internet (20) to the data plane (102). The data plane (102) forwards the data packet (10) via return data transmission paths (26b) to the RAN (16). The RAN (16) forwards the data packet (10) via return wireless data transmission paths (24b) to the polling device (12b, 12c, or 12d), as the case may be.

In comparison with data packet routing described in the above Background section with reference to FIG. 1, the present invention may have potential advantages, although it will be understood that these advantages are not essential to the invention as claimed.

First, the present invention may allow for peer-to-peer communication of the IP data packet (10) from source device (12a) to destination devices (12b and 12c) without the latency attributable to signal transmission of the data packet (10) via the Internet (20) to the server (22), and the latency attributable to polling of the server (22) by destination devices (12b and 12c).

Second, the present invention isolates the IP data packet (10) from excluded device (12d), and thereby effectively enables "private" data packet routing for devices (12a to 12c), without devices (12a to 12c) having to run local encryption and decryption processes. This helps to limit the latency of data packet transmission. This is also technically significant if devices (12a to 12c) have limited computational capabilities, as may be the case with low cost and low power consumption wireless computer devices intended for use with a 5G cellular network in "Internet of Things" (IOT) and video gaming applications.

Third, the present invention provides a data packet traffic isolation protocol for a cellular network based on a device group relationship of wireless computer devices, while still allowing the devices to connect using any access point in the cellular network. The device group relationship may be conveniently defined by unique device identifiers such as IMEIs of devices, or IMSIs that are stored in association with user account information by the operator of a SPN. This contrasts with approaches to implementing an access model that rely on static configuration and maps to ports on a network switch, such as wireless local area networks (WLANs) and virtual local area network (VLANs).

Fourth, the present invention allows for differentiation of the IP data packet as being "private" or "public." As described above, this may be implemented by use of selective use of data packet structures, and selective IP address blocks. Accordingly, the present invention allows for selective routing of data packets to "privately" via the RAN without traversing the Internet, or "publicly" via the Internet.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A method for routing an Internet Protocol (IP) data packet, wherein the method is implemented by a router system adapted to transceive the IP data packet with a radio access network (RAN) of a cellular network, and with the Internet, wherein the router system comprises a processor and an operatively connected memory storing instructions executable by the processor to implement the method, and wherein the method comprises the steps of:
 (a) storing a device group relationship defining a set of unique device identifiers of a plurality of wireless computer devices;
 (b) receiving, via the RAN but without traversing the Internet, the IP data packet including a unique device identifier of a source wireless computer device that generated the IP data packet; and
 (c) forwarding, via the RAN but without traversing the Internet, the IP data packet to a destination wireless computer device, wherein the forwarding is conditional on the set of unique device identifiers comprising both a unique device identifier of the destination wireless computer device, and the unique device identifier of the source wireless computer device included in the IP data packet.

2. The method of claim 1, wherein the method further comprises, after the step of receiving, via the RAN but without traversing the Internet, the IP data packet and before the step of forwarding, via the RAN but without traversing the Internet, the IP data packet to the destination wireless computer device, the step of determining whether the IP data packet is either to be forwarded via the Internet or not to be forwarded via the Internet, and wherein the step of forwarding, via the RAN but without traversing the Internet, the IP data packet to the destination wireless computer device is further conditional on determining that the IP data packet is not to be forwarded via the Internet.

3. The method of claim 2, wherein the method further comprises the step of forwarding the IP data packet to the Internet, conditional on the determining that the IP data packet is to be forwarded via the Internet.

4. The method of claim 2, wherein the step of determining whether the IP data packet is to be forwarded via the Internet or not to be forwarded via the Internet is based on determining that the IP data packet is to be forwarded via the Internet if the IP data packet has a first data packet structure, and determining that the IP data packet is not to be forwarded via the Internet if the IP data packet has a second data packet structure that is different from the first data packet structure.

5. The method of claim 4, wherein the first data packet structure is an IPv6 data packet structure, and the second data packet structure is an IPv4 data packet structure, or vice versa.

6. The method of claim 2, wherein the step of determining whether the IP data packet to be forwarded via the Internet or not to be forwarded via the Internet is based on determining that the IP data packet is to be forwarded via the Internet if the IP data packet has a destination IP address within a specified IP address block, and determining that the IP data packet is not to be forwarded via the Internet if the destination IP address is outside of the specified IP address block, or vice versa.

7. The method of claim 1, wherein each of the unique device identifiers comprises part or all of an international mobile subscriber identity (IMSI) stored in a SIM card memory or other memory associated with each of the plurality of wireless computer devices.

8. The method of claim 7, wherein the device group relationship defines the set of unique device identifiers by association of the IMSIs to a common user account or related user accounts of the cellular network.

9. The method of claim 1, wherein each of the unique device identifiers comprises an international mobile equipment identity (IMEI) stored in a memory associated with each of the plurality of wireless computer devices.

10. The method of claim 1, wherein the RAN is a 5G network.

11. A router system for routing an Internet Protocol (IP) data packet, wherein the router system is adapted to transceive the IP data packet with a radio access network (RAN) of a cellular network, and with the Internet, and wherein the router system comprises a processor and an operatively connected memory storing instructions executable by the processor to implement a method comprising the steps of:

(a) storing a device group relationship defining a set of unique device identifiers of a plurality of wireless computer devices;

(b) receiving, via the RAN but without traversing the Internet, the IP data packet including a unique device identifier of a source wireless computer device that generated the IP data packet; and (c) forwarding, via the RAN but without traversing the Internet, the IP data packet to a destination wireless computer device, wherein the forwarding is conditional on the set of unique device identifiers comprising both a unique device identifier of the destination wireless computer device, and the unique device identifier of the source wireless computer device included in the IP data packet.

12. The router system of claim 11, wherein the method further comprises, after the step of receiving, via the RAN but without traversing the Internet, the IP data packet and before the step of forwarding, via the RAN but without traversing the Internet, the IP data packet to the destination wireless computer device, the step of determining whether the IP data packet is either to be forwarded via the Internet or not to be forwarded via the Internet, and wherein the step of forwarding, via the RAN but without traversing the Internet, the IP data packet to the destination wireless computer device is further conditional on determining that the IP data packet is not to be forwarded via the Internet.

13. The router system of claim 12, wherein the method further comprises the step of forwarding the IP data packet to the Internet, conditional on the determining that the IP data packet is to be forwarded via the Internet.

14. The router system of claim 12, wherein the step of determining whether the IP data packet is to be forwarded via the Internet or not to be forwarded via the Internet is based on determining that the IP data packet is to be forwarded via the Internet if the IP data packet has a first data packet structure, and determining that the IP data packet is not to be forwarded via the Internet if the IP data packet has a second data packet structure that is different from the first data packet structure.

15. The router system of claim 14, wherein the first data packet structure is an IPv6 data packet structure, and the second data packet structure is an IPv4 data packet structure, or vice versa.

16. The router system of claim 12, wherein the step of determining whether the IP data packet is to be forwarded via the Internet or not to be forwarded via the Internet is based on determining that the IP data packet is to be forwarded via the Internet if the IP data packet has a destination IP address within a specified IP address block, and determining that the IP data packet is not to be forwarded via the Internet if the destination IP address is outside of the specified IP address block, or vice versa.

17. The router system of claim 11, wherein each of the unique device identifiers comprises a part or all of an international mobile subscriber identity (IMSI) stored in a SIM card memory or other memory associated with each of the plurality of wireless computer devices.

18. The router system of claim 17, wherein the device group relationship defines the set of unique device identifiers by association of the IMSIs to a common user account or related user accounts of the cellular network.

19. The router system of claim 11, wherein each of the unique device identifiers comprises an international mobile equipment identity (IMEI) stored in a memory associated with each of the plurality of wireless computer devices.

20. The router system of claim 11, wherein the RAN is a 5G network.

21. A computer program product comprising a non-transitory, tangible, computer readable medium storing instructions executable by a processor forming part of a router system adapted to transceive an IP data packet with a radio access network (RAN) of a cellular network, and with the Internet, to implement a method for routing an Internet Protocol (IP) data packet, the method comprising the steps of:
  (a) storing a device group relationship defining a set of unique device identifiers of a plurality of wireless computer devices;
  (b) receiving, via the RAN but without traversing the Internet, the IP data packet including a unique device identifier of a source wireless computer device that generated the IP data packet; and
  (c) forwarding, via the RAN but without traversing the Internet, the IP data packet to a destination wireless computer device, wherein the forwarding is conditional on the set of unique device identifiers comprising both a unique device identifier of the destination wireless computer device, and the unique device identifier of the source wireless computer device included in the IP data packet.

22. The computer program product of claim 21, wherein the method further comprises, after the step of receiving, via the RAN but without traversing the Internet, the IP data packet and before the step of forwarding, via the RAN but without traversing the Internet, the IP data packet to the destination wireless computer device, the step of determining whether the IP data packet is to be forwarded via the Internet or not to be forwarded via the Internet, and wherein the step of forwarding, via the RAN but without traversing the Internet, the IP data packet to the destination wireless computer device is further conditional on determining that the IP data packet is not to be forwarded via the Internet.

23. The computer program product of claim 22, wherein the method further comprises the step of forwarding the IP data packet to the Internet, conditional on the determining that the IP data packet is to be forwarded via the Internet.

24. The computer program product of claim 22, wherein the step of determining whether the IP data packet is to be forwarded via the Internet or not to be forwarded via the Internet is based on determining that the IP data packet is to be forwarded via the Internet if the IP data packet has a first data packet structure, and determining that the IP data packet is not to be forwarded via the Internet if the IP data packet has a second data packet structure that is different from the first data packet structure.

25. The computer program product of claim 24, wherein the first data packet structure is an IPv6 data packet structure, and the second data packet structure is an IPv4 data packet structure, or vice versa.

26. The computer program product of claim 22, wherein the step of determining whether the IP data packet is to be forwarded via the Internet or not to be forwarded via the Internet is based on determining that the IP data packet is to be forwarded via the Internet if the IP data packet has a destination IP address within a specified IP address block, and determining that the IP data packet is not to be forwarded via the Internet if the destination IP address is outside of the specified IP address block, or vice versa.

27. The computer program product of claim 21, wherein each of the unique device identifiers comprises part or all of an international mobile subscriber identity (IMSI) stored in a SIM card memory or other memory associated with each of the plurality of wireless computer devices.

28. The computer program product of claim 27, wherein the device group relationship defines the set of unique device identifiers by association of the IMSIs to a common user account or related user accounts of the cellular network.

29. The computer program product of claim 21, wherein each of the unique device identifiers comprises an international mobile equipment identity (IMEI) stored in a memory associated with each of the plurality of wireless computer devices.

30. The computer program product of claim 21, wherein the RAN is a 5G network.

* * * * *